United States Patent
Walker

[11] 3,803,398
[45] Apr. 9, 1974

[54] DISPLAY DEVICE

[76] Inventor: Edward Craven Walker, Woodspen, Forest Corner, Ringwood, Hampshire, England

[22] Filed: July 5, 1972

[21] Appl. No.: 269,050

[30] Foreign Application Priority Data
July 14, 1971 Great Britain..................... 33135/71
Jan. 28, 1972 Great Britain..................... 4149/72

[52] U.S. Cl................................ 240/10 L, 240/81 R
[51] Int. Cl............................. F21s 1/12, F21p 3/00
[58] Field of Search...... 240/1 EI, 10 R, 10 P, 10 T, 240/10.1, 81 R, 1 LP, 10 L

[56] References Cited
UNITED STATES PATENTS
3,532,874   10/1970   Rosenast........................... 240/1 CP
3,735,113   5/1973   Statt................................. 240/6.4 G
3,641,335   2/1972   Wall............................. 240/10 T X
3,624,385   11/1971   Wall............................. 240/10 T X
3,564,233   2/1971   Cox et al........................... 240/10 T
3,536,908   10/1970   Osten........................... 240/1 EL X
3,538,321   11/1970   Longenecker et al............ 240/1 EL

*Primary Examiner*—Joseph F. Peters, Jr.
*Attorney, Agent, or Firm*—Donald D. Jeffery

[57] ABSTRACT

A display device comprises a plurality of optical fibres bunched together at one end, at which there is a light source. The bunched ends of the light source are hidden from view inside a support from which the fibres project upwardly and are for the most part splayed apart. The projecting portions of the fibres are contained in a sealed unit and means are provided for also keeping the fibres bunched together at least at their tips during transport.

16 Claims, 7 Drawing Figures

DISPLAY DEVICE

The invention relates to a fibre optics display device, i.e. a device used for attracting the attention of passers-by and/or as a decorative article and operating on the principle known as fibre optics.

In fibre optics, light introduced at one end of a usually cylindrical transparent or translucent filament, strand or tube (hereinafter generically referred to as a 'fibre') is invisibly transmitted therealong and visibly emitted at the other end, even if the fibre is curved or bent. Special so-called fibre optic materials are commerically available which exhibit this phenomenon. Ror present purposes, it suffices to say that the transparent or translucent material of the fibre can be a plastics or glass, for example a composite glass comprising a core having a high refractive index surrounded by a thin coating of low refractive index. Fibre optics has found many important beneficial applications and the purely decorative effect of light emanating from the end of a fibre without any apparent light input can also be employed in display devices. The invention primarily aims to improve the safety and decorative effect of such display devices and in some instances to simplify their construction and permit a variation in the display effect to be obtained.

Basically, a display device according to the invention comprises a plurality of optical fibres bunched together at one end and a light source adjacent the bunched ends, the fibres being mounted in relation to a support so that the bunched ends and the light source are hidden from view by the support whilst portions of the lengths of the fibres project upwardly from the support and are for the most part normally splayed apart at their tips to present, for example, a spray or fountain effect.

It has been mentioned that the fibres may be of plastics or glass. Plastics fibres are not so fragile and therefore do not, as in the case of glass fibres, present such a grave safety hazard to children if the fibres are handled carelessly or eaten. However, the display effect achievable with glass fibres can be by far superior to that of plastics fibres because glass optical fibres are thinner and therefore as many as 40,000 glass fibres may be used in a display device that could accommodate only 200 or 300 of the plastics fibres. It is therefore preferred to use glass fibres and take special safety precautions.

In one form of the invention, the fibres are accommodated in a sealed unit which is fitted to the support and at least the top of the sealed unit is transparent so that the fibres are visible. The fibres can therefore not be touched but their bunched ends, preferably contained in a sleeve, will need to project from the bottom of the sealed unit so that they can protrude into the support towards the light source.

With a sealed unit, the fibres can of course not be fanned by air convection currents as would be the case with exposed fibres in a room where the display device is located. Provision is therefore preferably made for means effective to produce variations in the light effect visible at the tips of the fibres. These means may comprise a fan within the support, the fan being rotated by a motor and effective to pass air to within the sealed unit to stir the fibres and thus enhance the display effect in so far that the illuminated tips of the fibres will be stirred by a breeze or shaken by gentle gusts as may be desired. The air may be supplied via filters which keep out dust and the air will also be useful to cool the light source. Apertures in the bottom of the sealed unit to permit the circulation of air should be kept small and are preferably covered with fine metal gauze. The reference to a sealed unit should therefore not be taken to refer to a hermetic seal but rather to a construction like the sealed headlight unit of an automobile.

With glass optical fibres, it is desirable to prevent them from flexing and vibrating during transport of the display device because they are extremely brittle. Means are therefore preferably provided for keeping the fibres bunched together at least at their tips as well as at the ends adjacent the light source. For example, a displaceable adjusting ring or tube which may be provided around the fibres for varying the extent to which the bunch of fibres are spread apart at their tips in the display condition may be displaceable along the entire length of the fibres so that the latter can also be kept bunched together at the tips during transport. Since the adjusting ring or tube will not be manually accessible within the sealed unit, means are then provided for controlling the position of the ring or tube from outside the sealed unit. The control means may be in the form of thin rods which project through the bottom of the sealed unit and are either removable before the sealed unit is replaced on the support or can be folded out of the way by means of hinges. Instead of a displaceable ring which directly encircles the fibres, the bunching means may comprise two or more elongated tube segments which are hinged at their lower ends and which, by means of a ring or scissor linkage actuatable from outside the sealed unit, can be swung to close over the fibres and define a tube which imprisons the fibres during transport. In another and preferred form of the invention, a wire helix which is threaded through a hole in the bottom of the sealed unit is employed to encircle the fibres during transport. Before the display device is used, the user unscrews the helix and removes it.

Instead of the tips of the fibres being constantly illuminated whenever the light source is on, the aforementioned means for varying the light effect visible at the fibre tips may, in addition to or instead of the fan, comprise means for varying the illumination from the source. In its simplest form, the light source is an electric bulb of which the illumination is changed by a flasher device so that the tips of the fibres will twinkle or flicker as the bulb is switched alternately on and off. Alternatively, a twinkling effect can be produced by interposing a rotary metal or plastics gauze between a constant light source and the bunched fibre ends. Preferably, however, the illuminated tips are made to change colour and this can best be achieved by interposing a transparent or translucent rotary disc between the bulb and the bunched fibre ends, the disc being provided with areas of different colours so that, as the disc is rotated, the fibre tips will change colour corresponding to the particular area or areas through which the light from the bulb happens to be passing. The term 'colour' is herein intended to include black or white, it being understood that some of the areas marked on the disc may be opaque. If the disc is marked with sharply defined areas of different colour, the colour change at the fibre tips is correspondingly abrupt. Gradual colour changes may be preferable and these are obtainable by crescent-shaped coloured areas on the disc. Many other arrangements of coloured stripes or spots on the disc are possible and it is also possible to paint the ends of the fibres themselves. Rotation of the disc may be brought about by a miniature electric motor inside the support and both the motor and light bulb may be energised from the mains through a transformer so that only tolerable heat will be generated in operation. However, a heat shield is preferably provided above the light bulb, the heat shield being of course transparent to permit light to travel through it to the bunched fibre ends. In the preferred arangement, the bunched fibres are disposed above the rotary disc, the disc is above the heat shield and the latter is above the light bulb, a reflector being provided to focus the light.

The bunched ends of the fibres may be resin-bonded either in a sleeve by which the fibres are mounted or they are simply bonded together or over a cylindrical core or between concentric tubes to form a cylindrical spigot which projects into the support through an aperture in the sealed unit. The bunched fibre ends may also be clamped in a crimped sleeve. A collar on the sleeve or spigot limits the amount of projection through the aperture.

The disposition of the tips of the fibres may be adjustable so that the user may select a spray or fountain arrangement that he finds most pleasing. Such adjustability can be achieved by means of the aforemenioned displaceable ring or a sleeve, or two or more such rings or sleeves, through which some or all of the fibres are passed, the location of the ring(s) or sleeve(s) along the fibres determining the extent to which the fibres are spread apart. This aspect of the invention also enables the fibres to be kept bunched together along substantially their entire length when the display device is to be transported as previously described, although in this case a single adjusting ring or sleeve or a helix would be preferable.

The tips of a few selected adjacent fibres may be received in an apertured or hollow translucent and possibly coloured bead or bobble or sphere which will be illuminated by the tips therein and which presents a glowing effect to the viewer. A few of such beads, which may be of plastics material, interspersed amongst the exposed fibre tips can considerably enhance the display properties of the device.

Examples of the invention will now be described with reference to the accompanying drawings wherein.

Figure 1:
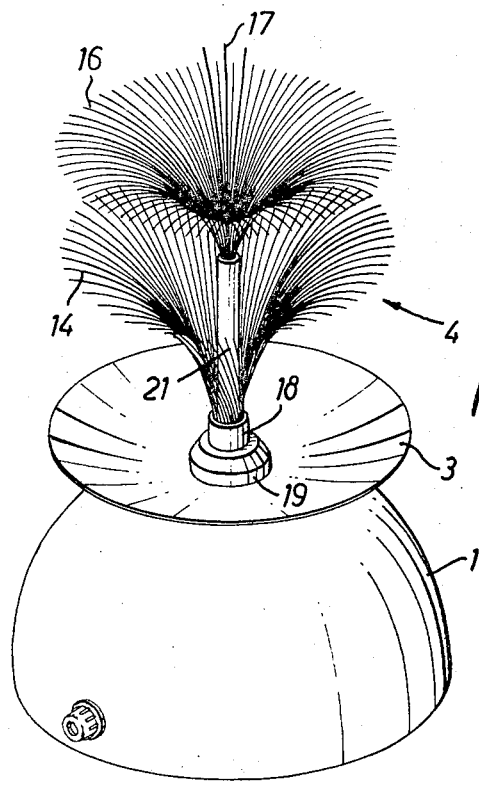
FIG. 1 is a perspective view of a fibre optics display device with the cover of the sealed unit omitted for clarity.

The display device of FIG. 1 comprises a support 1 of inverted bowl shape which has a removable base plate 2 (FIG. 2) and carries an ornamental dished plate 3 which forms the bottom plate of a sealed unit. A transparent top or dome of the sealed unit is not shown in FIG. 1. A central hole (not visible) in the plate 3 and support 1 enables an assembly 4 of optical fibres in the sealed unit to project into the support.

Figure 2:
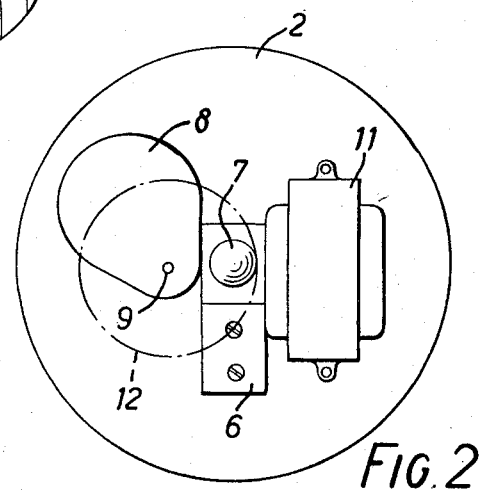
FIG. 2 is a diagrammatic plan view of a removable base of the support of the FIG. 1 device.

Referring to FIG. 2, the base plate 2 of the support has bolted to it a metal bracket 6 for supporting a six-volt electric light bulb 7 centrally below the fibre-receiving hole of the support 1, an electric motor and gearing unit 8 having an output spindle 9, and a transformer 11 for stepping down the mains voltage. A low voltage light bulb 7 is preferred to minimise the heat generated by it. A transparent or translucent rotary plastics disc 12 bearing a colour pattern is interposed between the bulb 7 and the fibre-receiving hole of the support 1. The disc 12 carries a sleeve 13 (see FIG. 3) which is engaged over the output spindle 9 of the unit 8 and thus the output spindle serves to support and turn the disc.

In the FIG. 1 embodiment, the fibre assembly 4 comprises a tuft of filaments 14, a tuft of glass or plastics filaments 16 and a few central strands 17 which are somewhat thicker and stiffer than the filaments 14. The fibres in each tuft may be of different lengths and their lengths may also differ from one tuft to the other. All the fibres are bunched and resin-bonded at one end (the end not visible in FIG. 1 because it projects into the support 1) and the tips are splayed apart to give a fountain effect. The bunched ends are contained in a sleeve 18 which is provided with a displaceable collar 19. By adjusting the collar 19 on the sleeve 18, a position can be obtained at which the hidden bunched ends of the fibres are located immediately above the rotary disc 12 in line with the bulb 7. The filaments 16 and strands 17 are contained within a tube 21 which separates the filaments 16 from the filaments 14 to form the two tufts.

In operation, light from the bulb 7 passes through the rotary disc 12 into the bunched ends of the fibres, is invisibly transmitted along the fibres and is emitted visibly at the tips to give a pleasant display effect in darkened surroundings. If desired, the edges of the sleeve 18 and tube 21 may also be lit up if the sleeve and tube are made from fibre-optic material. If the disc 12 is marked with alternately opaque and transparent areas then, as these areas pass over the bulb, the tips of the fibres will flash alternately on and off. If, as is preferred, the disc is provided with differently coloured areas, the tips of the fibres will correspondingly change colour.

Figure 3:
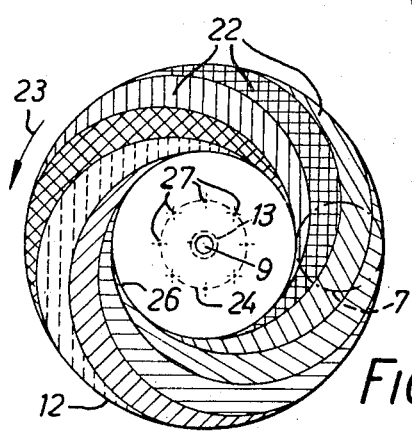
FIG. 3 is an enlarged plan view of a rotary disc employed in the FIG. 1 device.

A particularly suitable colour arrangement for the disc 12 to produce gradual rather than abrupt colour changes at the tips of the fibres is shown in FIG. 3 where the position of the light bulb 7 is indicated in chain-dotted lines. The disc is provided with crescent-shaped areas 22 of different colour and is turned slowly (at about 1–4 r.p.m.) in the direction of the arrow 23 during operation of the device. The direction of rotation is not critical. An easy way of determining the boundaries of the areas 22 is to mark the disc with two concentric guide circles 24 and 26 so that the diameters of the disc 12 and circles 26, 24 are in the ratio 4:2:1 and the width of the annulus between the circle 26 and the circumference of the disc corresponds to the bulb diameter. The guide circle 24 is scribed with points 27 and 45° intervals and the outlines of the crescents are then marked by describing a total of eight arcs, each of which has its centre at one of the points 27 and each of which is substantially tangential to the circle 26 and the circumference of the disc.

Figure 4:
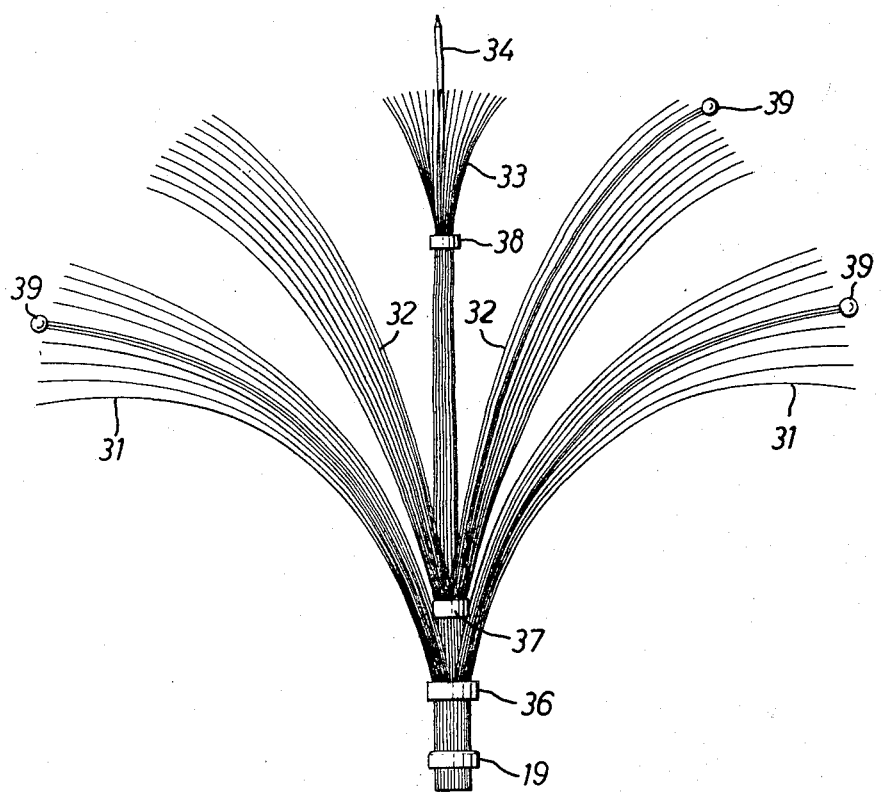
FIG. 4 is an enlarged idagrammatic side elevation of an alternative fibre arrangement for the FIG. 1 device.

FIG. 4 diagrammatically illustrates an alternative fibre arrangement for the display device. The fibres, which may be of different lengths, are here disposed in three tufts comprising filaments 31, 32 and 33, a central and longer strand 34 being included in the tuft of filaments 33. It is emphasised that the illustration is diagrammatic because in reality each tuft is formed by an unbroken annulus of fibres. Also, it is unlikely that the fibres 33 would be as closely juxtaposed as shown. All the fibres are bonded together to form a cylindrical spigot at the normally hidden bunched end and provided with the aforementioned displaceable collar 19. The bunched ends may be arranged about a single tubular core (not shown) or the fibres of different tufts may be arranged about separate such cores. A displaceable ring 36 embraces all the fibres and its position along the fibres relatively to the bonded end or collar 19 determines the maximum extent to which the filaments 31 are splayed apart. Since it is desired that most of the illuminated tips of the fibres be visible, it is preferred that none of the filaments 31 should droop substantially beyond the horizontal. A second displaceable ring 37 surrounds only the fibres 32, 33 and 34 and in effect prolongs the bunching of these fibres before they can spread. Accordingly, the position of the ring 37 relatively to the collar 19 is effective to control the maximum extent to which the filaments 32 are splayed apart. However, the ring 37 also prevents the filaments 31 from standing up too straight under their inherent resilience. This is important as it dispenses with the need for pre-bending the filaments 31 during manufacture to give the spray effect. Finally, a displaceable ring 38 surrounds the filaments 33 and, in practice, this ring will be disposed much nearer the ring 37 to hold the filaments 32 depressed. The central strand 34 has its tip ground or cut to a point for a better visual effect. During transport, in the case of glass fibres, the ring 36 should be located near the tips of the fibres to hold these bunched together.

FIG. 4 also illustrates that a few adjacent filament tips may be inserted in a translucent coloured plastics bobble 39 which glows when the device is operating.

Figure 5:
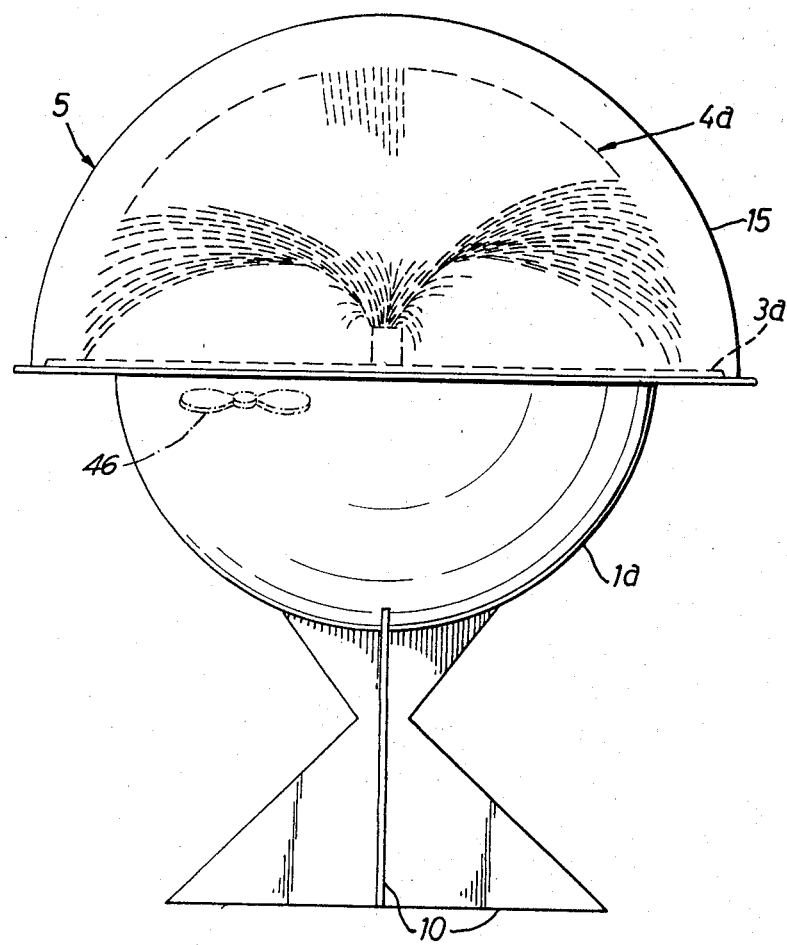
FIG. 5 is a side elevation of another form of display device.
Figure 6:
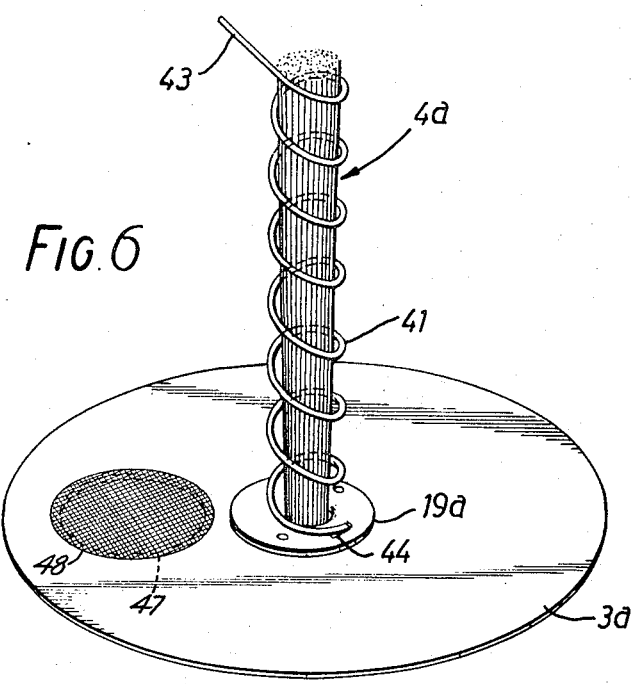
FIG. 6 is a top perspective view on a bottom plate of the sealed unit of the FIG. 5 device.
Figure 7:
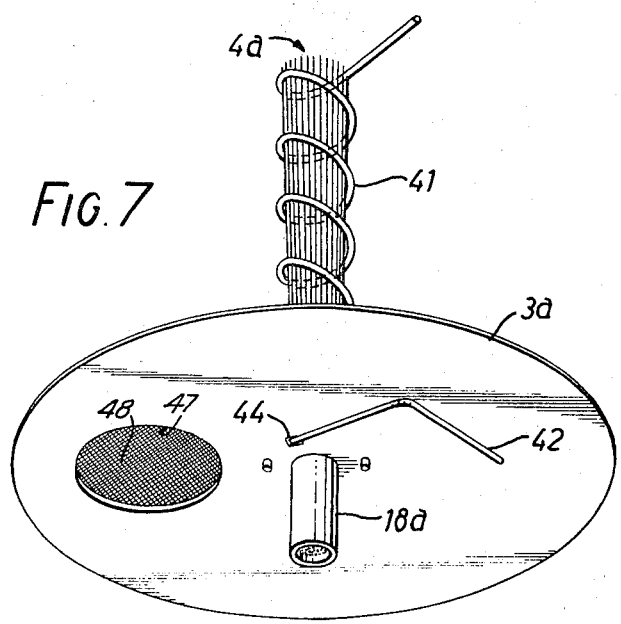
FIG. 7 is an underneath perspective view of the FIG. 6 plate.

The display device of FIGS. 5 to 7 comprises a support 1a and a sealed unit 5 containing an assembly 4a of optical fibres. The support is hemispherical and is itself supported by feet 10. The sealed unit comprises a flat bottom plate 3a of opaque material and a transparent dome 15. The support 1a contains the same components that are carried by the plate 2 of FIG. 2, as well as a motor driven fan indicated in dashed lines at 46 in FIG. 5, effective to pass air to within the sealed unit 5 to stir the fibres and thus enhance the display effect in so far that the illuminated tips of the fibres will be stirred by a breeze or shaken by gentle gusts as may be desired. As shown in FIGS. 6 and 7, the air is supplied through an aperture 47 in the plate 3a of the sealed unit and the aperture is covered with fine metal gauze 48 which acts as a filter.

The sealed unit 5 is removable from the support 1a so that access may be had to the underface of the bottom plate 3a. Referring to FIGS. 6 and 7, where the transparent dome of the sealed unit has been omitted, the plate 3a contains an aperture through which the bunched ends of the assembly of fibres project. The fibres are bonded in a sleeve 18a which is formed at one end with an integral collar 19a riveted to the plate 3a. A wire helix 41 terminates in an integral handle 42 at one end and in a lateral extension 43 at the other end.

In the factory, before the display device is packed for transport, the helix is inserted with the extension 43 foremost, through a slot 44 in the collar 19a and plate 3a from the underface of the latter and preferably with the sealed unit held upside down so that the fibres are suspended from the plate 3a. As the helix is fed through the slot 44 it needs to be rotated and this causes the extension 43 to sweep or gather the fibres into a bundle which becomes surrounded by the helix. The length of the helix is chosen so that the handle 42 will abut the underface of the plate 3a when the entire length of the fibres is contained within the helix. The fibre assembly is now adequately protected against flexing under vibrations and shock arising during transport. The wire helix may be temporarily secured to the plate 3a by adhesive tape or a clip. Before use, the user detaches the handle from the plate and unscrews and discards the helix 41, whereafter the fibres are free to fan out naturally and assume their display condition. A flap (not shown) of rubber or other flexible material may be provided to cover the slot 44, the flap being deflected when the helix is in use.

I claim:

1. A display device comprising a plurality of optical fibres bunched together at one end and a light source adjacent the bunched ends, the fibres being mounted in relation to a support so that the bunched ends and the light source are hidden from view by the support whilst portions of the length of the fibres project upwardly from the support and are for the most part normally splayed apart at their tips, wherein the fibres are accommodated in a sealed unit which is fitted to the support, at least the top of said sealed unit being transparent.

2. A device according to claim 1, wherein the optical fibres are of glass.

3. A device according to claim 1, wherein the bunched fibre ends are bonded together.

4. A device according to claim 1, wherein the bunched fibre ends are contained in a sleeve.

5. A device according to claim 4, wherein the sleeve projects from the bottom of the sealed unit into the support.

6. A device according to claim 5, wherein the sleeve is provided with a collar to limit the amount by which it projects into the support.

7. A device according to claim 1, including means for keeping the fibres bunched together at least at their tips during transport.

8. A device according to claim 7, wherein said bunching means comprise a displaceable adjusting ring or sleeve around the fibres.

9. A device according to claim 7, wherein said bunching means comprises a removable wire helix passing through a hole in the bottom of the sealed unit and encircling the fibres.

10. A device according to claim 9, wherein the helix includes a lateral extension at one end effective to gather the fibres into a bundle as the helix is inserted through the hole.

11. A deve according to claim 1, including means effective to produce variations in the light effect visible at the tips of the fibres.

12. A device according to claim 11, wherein said means for varying the light effect comprises a fan within the support effective to pass air to within the sealed unit to stir the fibre tips.

13. A device according to claim 12, wherein the air enters the sealed unit through filters.

14. A device according to claim 11, wherein the colour of the light emitted at the fibre tips is variable.

15. A device according to claim 14, wherein a transparent or translucent rotary disc is interposed between the light source and the bunched fibre ends, the disc being provided with areas of different colours.

16. A device according to claim 15, wherein the differently coloured areas are crescent-shaped.

* * * * *